Oct. 31, 1967  L. S. ARONOFF  3,349,511
ILLUMINATED SIGN
Filed Aug. 12, 1964  2 Sheets-Sheet 1
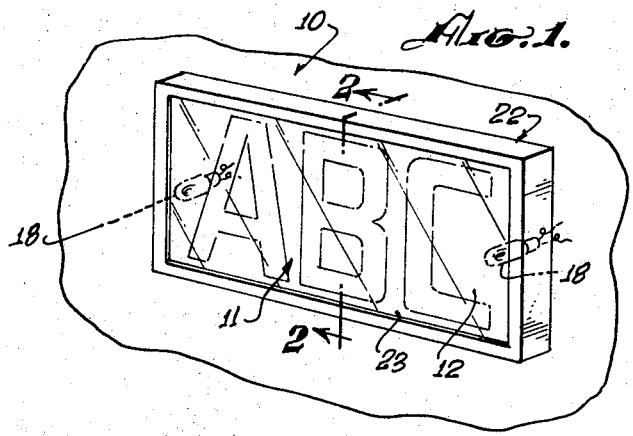
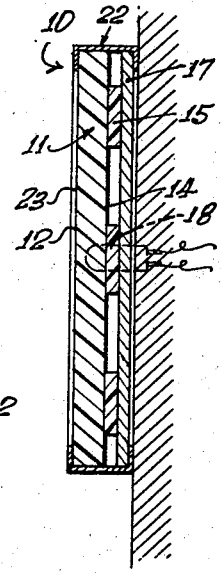
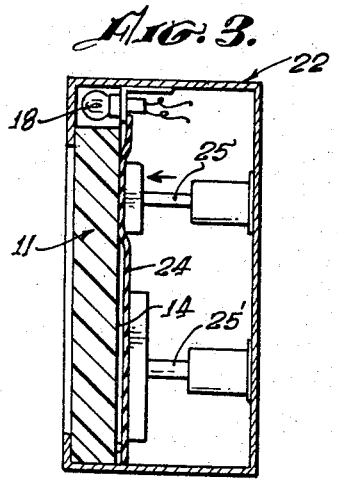
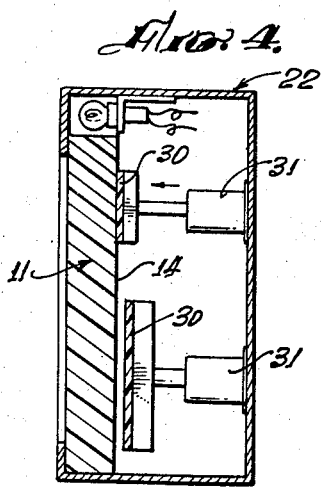
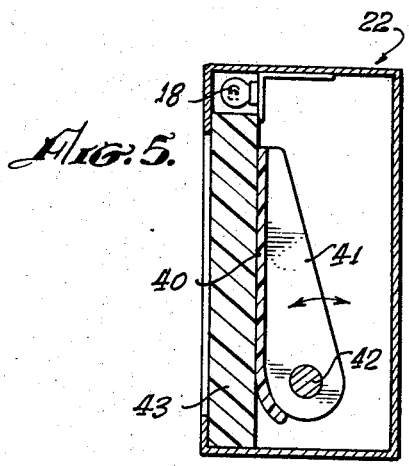
LEONARD S. ARONOFF,
INVENTOR.
BY HIS ATTORNEYS
*Spensley & Horn*

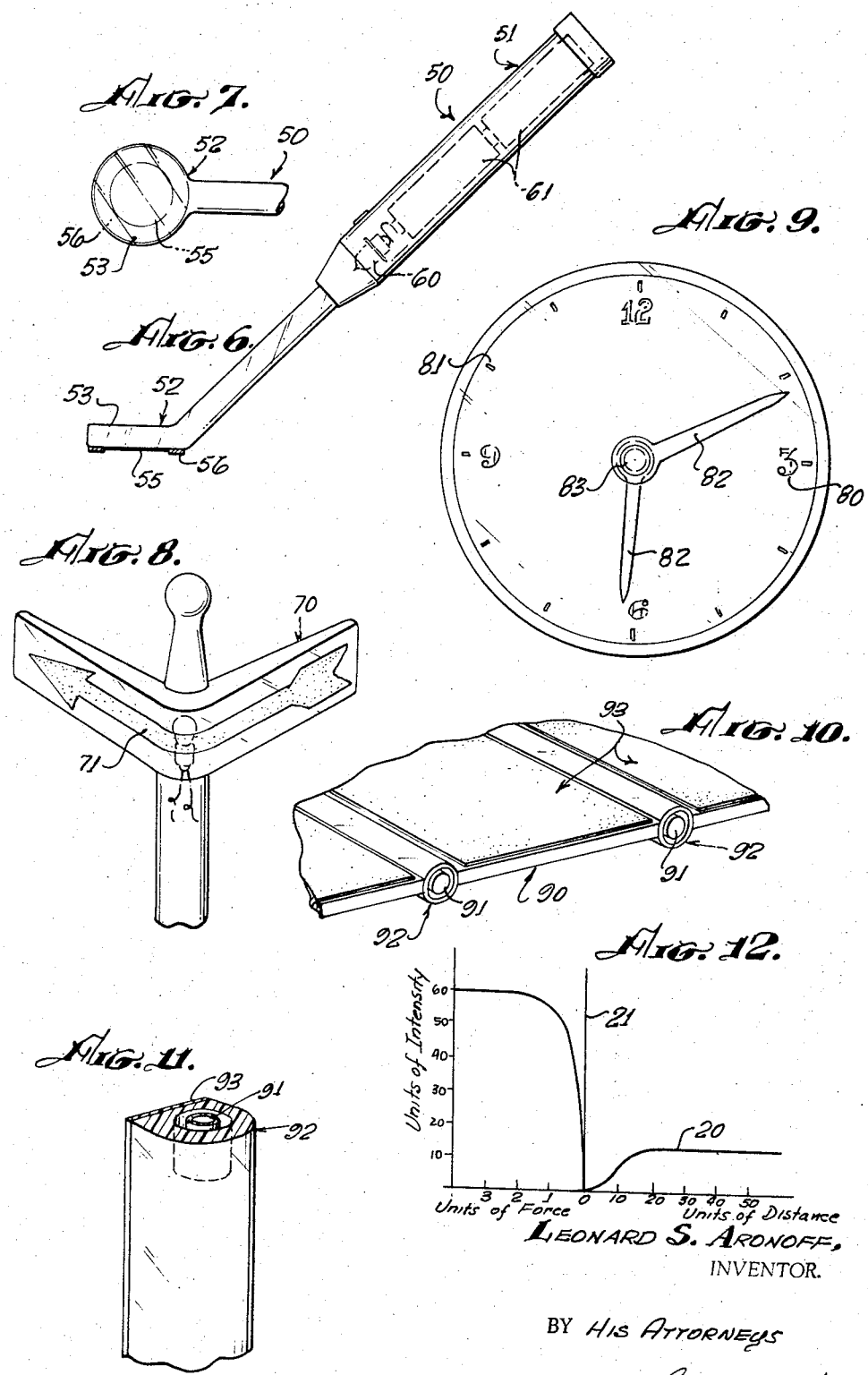

United States Patent Office 3,349,511
Patented Oct. 31, 1967

3,349,511
ILLUMINATED SIGN
Leonard S. Aronoff, 16751 Tupper St.,
Sepulveda, Calif. 91343
Filed Aug. 12, 1964, Ser. No. 389,142
6 Claims. (Cl. 40—130)

This invention relates to illuminated devices and more particularly to improved longitudinally lighted display, viewing, and other illumination devices.

In the prior art, longitudinally lighted devices use the effect and construction known as edge lighting. In this construction, a transparent sheet of rigid material such as glass or plastic is illuminated by means of lamps or the like at points around the periphery of the transparent sheet. The light from the light source is transmitted longitudinally, i.e., planar to the major surfaces of the sheet. The lighted displays in the prior art are not efficient in utilizing the light longitudinally transmitted through the sheet and such inefficiency results in a display of non-uniform reflection, low contrast, and derivatively poor visibility.

Accordingly, it is an object of this invention to provide a uniformly lighted display device, viewing device, or the like.

It is another object of this invention to provide a display where the outlines of that which is to be viewed are sharply and clearly defined.

Yet another object of this invention is to provide a display sharply contrasted with its viewing background.

A further object of this invention is to efficiently utilize the longitudinal lighting of a device for display or viewing.

Another object of this invention is to provide a display device, which is uniformly lighted and sharply contrasted, and in which the objects being displayed can be removed from view and brought back into view with the illumination still present.

Another object of this invention is to provide a display device in which the display is brilliant and sharp in the daylight as well as in the nighttime.

Another object of this invention is to provide large and small surface area luminaries, usable light sources, and displays of relatively even intensities with the use of a minimum number of light sources.

Another object of this invention is to provide a display with an exceptionally large field of view thus providing sharp focus from an unlimited viewing angle and minimizing parallax and depth distortion problems.

Another object of this invention is to provide a display of any color or combinations of colors by filtering the light source or end product or both.

The apparatus of the present invention utilizes an opaque diffusing surface engaged in intimate contact, as more fully defined hereinafter, with a transparent light carrying material in which longitudinally transmitted light is contained.

The novel features which are believed to be characteristic of the invention, both as to its organization and method of operation, together with further objects and advantages thereof will be better understood from the following description considered in conjunction with the accompanying drawing in which a presently preferred embodiment of the invention is illustrated by way of example. It is to be expressly understood, however, that the drawing is for the purpose of illustration and description only, and is not intended as a definition of the limits of the invention.

FIGURE 1 is a perspective view of an illuminated display incorporating the invention;

FIGURE 2 is a cross-sectional view taken along line 2—2 of FIGURE 1;

FIGURE 3 is a cross-sectional view of an illuminated display in which the display is sequentially presented;

FIGURE 4 is a cross-sectional view of an illuminated display in which the display is, in a different manner from that shown by FIGURE 3, sequentially presented;

FIGURE 5 is a cross-sectional view of an illuminated sign in which the display is, in a continuous form, sequentially presented, whereby a writing effect is achieved;

FIGURE 6 is a side view of a mirror inspection device incorporating the invention;

FIGURE 7 is a partial plan view of the device shown in FIGURE 6;

FIGURE 8 is a fragmented perspective view of a curved street or information sign incorporating the invention;

FIGURE 9 is a fragmented perspective view of an illuminated clock face incorporating the invention;

FIGURE 10 is a fragmented perspective view of a light panel incorporating the invention;

FIGURE 11 is a fragmented perspective of an illuminated wall lamp incorporating the invention; and FIGURE 12 is a graph representing the intensity of reflected light as a function of distance relative to the surface of the panel.

The present invention has been found to be applicable to many embodiments and before proceeding to a detailed description of such embodiments of apparatus in accordance with the present invention, a generalized description of an illustrative embodiment to point out the critical factors of the present invention and the results which occur will serve to illustrate the common factors in all of the embodiments. Thus, referring to FIGURES 1 and 12 there is shown in FIGURE 1 a display sign in accordance with the present invention which includes a transparent sheet of material which can be glass or plastic, such as acrylic, which is referred to hereinafter as a light transmitting body or sheet 11. A light source 18 is so positioned as to direct light longitudinally through the sheet 11, i.e., between the major surfaces 12 and 14 thereof. In the embodiment shown the light source is a lamp 18 positioned at an edge of the sheet. As discussed hereinafter the light source can be positioned otherwise, such as in a transverse cavity in the sheet. The light source and its position relative to the sheet 11 is such as to most efficiently conduct or transmit the light between the surfaces 12 and 14. In addition, the edges of the sheet are covered by a reflective material which causes the light transmitted to the edges to be reflected back into the sheet between the major surfaces thereof. In accordance with the present invention it has been found that the light is most efficiently reflected back into the sheet when the edges are covered by a reflective material in intimate contact with the edges. Intimate contact is discussed more fully hereinafter. Display members 15 which are the letters, characters or indicia to be displayed are positioned on the rear surface 14 of the sheet in intimate contact therewith. The display members 15 are made of opaque material capable of being put into intimate contact with the surface 14 of the light transmitting sheet. Such materials include pressure sensitive tapes, thermo setting tapes, rigid materials such as plastics, metals, woods, fibres, and rubber; and semi-rigid materials such as epoxys, plastics, fibres, rubbers and the like; as well as resilient materials such as epoxys, rubbers, plastics, fibres, cloth and paint. The critical factor in accordance with the present invention is intimate contact between the opaque diffusing surface of the display member and the surface of the light transmitting body, i.e., the surface 14 of the sheet 11. The display members must be so positioned upon the surface of the light transmitting member that no voids exist in the interface between the opaque surface of the display member and the surface 14 of the light transmitting body. Various means of achieving such intimate contact will be described hereinafter. Another critical factor found in apparatus in accordance with the present invention is the extent of the uninterrupted surface area of the display member. That is, it has been found that light is reflected more brilliantly at the edges of the opaque surface and that when the area of the opaque surface is of considerable extent the brilliance decreases away from the edges. In accordance with the present invention the surface area of the display members is minimized as discussed more fully hereinafter.

Referring now to FIGURES 1 and 12 the operation of the present invention as presently understood can be described.

Thus, in connection with the embodiment shown in FIGURE 1, considering first the condition with the display members removed from the light transmitting sheet 11 and with the light source on such that light is being conducted longitudinally through the sheet and reflected longitudinally back into the sheet from the edges thereof. If the longitudinal transmission is efficient little or no light will escape transversely from the light carrying sheet so that if an observer views the sheet from a transverse direction he will see only a transparent sheet of material with no light obviously present. However, if an observer views an object through the transparent light carrying sheet which object is at a substantial distance to one side of the sheet with the observer on the other side of the sheet, he will see the object in the same manner as if the sheet did not exist. Referring now to FIGURE 12, it can be seen that on the right hand side of the ordinate in the figure, the intensity of the light reflected from the red surface of the exemplary display members is comparable to that which would exist if no transparent sheet 11 were interposed. Thus, in the graph of FIGURE 12 the portion of the graph to the right of the ordinate is of substantially constant intensity at a substantial distance from the ordinate which represents the contact surface 14 of the sheet 11. This portion of the intensity curve is identified as 20. As the surface of the opaque display member approaches the surface 14 of the light transmitting body represented by the ordinate 21 its intensity remains uniform until it comes into very close proximity to the surface 14. When it is in contact with the surface 14 it darkens down until the intensity is substantially zero at the ordinate and reflects little or no light. Thus, for example, when the red surface is viewed through the sheet with the display member in contact with the surface 14 the color red diminishes and a dull grey outline of the material forming the display member is visible. If, however, the display member is then moved into intimate contact with the surface 14 the red suddenly becomes brilliant and substantially luminous. It is the intimate contact which brings about this phenomenon. Such intimate contact can be achieved, as for example, by exerting substantial pressure upon the display member. This is indicated by the curve to the left of the ordinate where the intensity is shown to increase as a function of units of force exerted upon the opaque surface. Thus, all of the voids existing at the interface between the opaque surface of the display member are eliminated. It has been found in accordance with the present invention that upon the application of pressure between the opaque material and the surface 14 of the sheet 11, the points of pressure at which intimate contact is being obtained become brilliant to a degree resembling luminescence which becomes uniform as the entire area is brought into intimate contact. It has been found further that the angle at which the brilliance can be viewed is extremely large and that little or no parallax results.

To further illustrate the apparatus of the present invention prior to proceeding to the detailed description of various embodiments consider now that in addition to the display members 15 of FIGURE 1 a background material of the same color is superimposed over the display members. That is, assume the display members 15 to be opaque white and in intimate contact with the surface 14. A white background sheet of the same color material is positioned to overlay the members 15. The background sheet is not in intimate contact with the surface 14. With no light transmitted through the sheet an observer will see the display letters as a lusterless white against the white background if the white background is spaced slightly from the surface 14. If the background is in contact, but not intimate contact, the display members appear lusterless but differ in color. The background material remains primarily white and lustrous in appearance while the display members are dull white in appearance. When a filter 23 of different color such as red is placed at the opposite side of the sheet 11, i.e., in contact with the surface 12 the letters are no longer distinguishable from the background. When the light source is turned "on" the display members become instantly and brilliantly visible. As discussed hereinbefore it has been found that the highest intensity of reflected light from the intimately contacting display members occurs at or near the edges of the opaque area of the members. Consequently uniform brilliance of the display can be obtained by maximizing the number of edges of the display members, by segmenting or the like, and thus minimizing the surface area. The proximity of one edge to another is not critical and the spacing between edges can be measured in thousandths of an inch so long as discrete edges are present.

From the foregoing it can be seen that the intimacy of contact can be tested by the appearance of the opaque display surface when no light is present in that the intimately contacting area appears lusterless white while the non-intimately contacting area appears lustrous white.

Referring now to particular embodiments and features of the present invention the display device as generally previously discussed is shown in FIGURE 1 and designated generally as 10. A rectangular rigid transparent sheet 11 of substantial thickness, a display of opaque reflecting members 15 and a backing sheet 17 are in stacked relationship. The transparent sheet is of glass or plastic or the like. The display members 15 are interposed between the transparent sheet 11 and the backing sheet 17. The backing sheet 17 is opaque plastic in the illustrated embodiment; however, the backing sheet 17 may be made of any opaque, translucent, or transparent material. The transparent sheet 11 and the backing sheet 17 are equal in peripheral dimension and are peripherally in coextensive alignment. The aligned assembly of the backing 17, the transparent sheet 11 and the display members 15 is contained by a metal frame 22 coextensive in peripheral extent with the periphery of the transparent sheet 11 and the backing sheet 17. The inside width of the frame 22 is substantially the same as the width of the stacked assembly so that in the completed display 10, the display members 15 are in intimate contact with the transparent sheet 11 and the backing sheet 17 is spaced apart laterally from the transparent sheet 11. Two lamps 18 are inserted proximate the horizontal sides of the transparent sheet in cavities provided therefore in the transparent sheet 11. The lamps 18 are retained by retaining means to the backing sheet 17.

Prior to assembly in the frame the edges of the transparent sheet are polished and are covered with opaque diffusing material that is in intimate contact with the edges. In the illustrated embodiment, thermosetting tape is used.

When the lamps are energized, light is transmitted longitudinally throughout the transparent sheet 11 and contained therein because of the reflective covering on the edges which is in intimate contact with the edges of the transparent sheet 11. Light is reflected off the surface of the display members 15 and because of the intimate contact of the display members 15 with the transparent sheet 11 the display is intensely and uniformly illuminated as described hereinbefore. The backing sheet 17 because of being spaced apart from the light carrying transparent sheet 11 appears lustrous. It should be noted that the backing sheet 17 does not reflect light because it is not in intimate contact with the light carrying sheet 11, its use is for assembly convenience and/or for darkening the display background and is not an essential part of the invention. It has been found that a display as shown in FIGURE 1 which is approximately four feet in length will display letters brilliantly with little or no parallax and do so from a single small light source at one end of the sheet 11. If desired, the display can be colored by the expedient of colored lamps as a light source or by use of colored filters over the display or by use of colored display material or any combination thereof.

Referring to FIGURE 3, an embodiment of the invention is shown utilizing a resilient sheet 24 as the display material. In this embodiment the edges of the transparent sheet are again reflectively covered and a light source 18 is positioned at an edge to conduct light longitudinally through the sheet 11. A plurality of plungers, two of which are shown, are mounted within a housing and are adapted to be reciprocated into and out of pressure contact with the surface 14. The resilient sheet 24 is spaced apart slightly from the surface 14 of the transparent sheet 11 and is formed of material having a smooth opaque diffusing surface which will be brought into intimate contact with the surface 14 by the pressure of the plungers. In operation, the plungers 25 and 25' are operated simultaneously or sequentially to bring portions of the resilient sheet 24 into intimate contact with the transparent sheet 11. These portions are in substantial conformance with the outer surface configuration of the plungers 25 and 25'. These portions of the resilient sheet are thus made reflective when the plungers 25 and 25' are actuated, and an intense and sharply defined display results. The plunger means can be hydraulic, electrical, pneumatic, manual or the like.

Referring to FIGURE 4, an embodiment of the invention is shown utilizing rigid display members 30 that can be presented sequentially. Operation is like that described for the embodiment in FIGURE 3 with the display material affixed rigidly to the outermost surface of the plunger means 31 and with the face of the plunger having the desired configuration to be displayed.

Referring to FIGURE 5, the display material 40 is bonded to a cam 41 rotating about shaft 42. When the cam 41 is actuated, the display member 40 is brought into intimate contact with transparent sheet 43 in a continuous sequential fashion resulting in a writing effect display.

Referring to FIGURES 6 and 7 an inspection tool 50 is shown as another embodiment of the invention. The tool 50 comprises a body portion, and a light carrying portion 51. The light carrying portion 51 has at its lower end an integral viewing section 52. The viewing section 52 is circular. The upper surface 53 is left uncovered. The bottom surface is mirrored in its central portion 55. The remaining outer annular section 56 of the bottom surface of the viewing portion is covered with an opaque diffusing material in intimate contact with the surface of the portion 56. The lighting carrying portion 51 except for the upper surface 52 of the viewing section is covered with an opaque reflecting material in intimate contact with the surface of the light carrying portion 51. The body portion contains a lamp 60, batteries 61 with means to retain the lamp and batteries in the body portion. Switching and connection means are provided into the body portion to enable selective energizing the lamp.

In operation, the lamp is energized and light is thereby transmitted through the transparent portion 51. The light is contained in the transparent portion because of the intimate covering of opaque diffusing material except where it is reflected up from the mirrored surface 55 and up from the reflective surface 56. This tool can be used by dentists, doctors, machinists, inspectors and by any one who required inspection in relatively inaccessible dark places. In this embodiment, the light reflects up from the viewing portion on to the subject to be viewed, the illuminated image is reflected back into the mirror and can be readily viewed thereupon.

Referring to FIGURE 8, a street sign is shown as another possible embodiment of the present invention. It is to be noted that the effect is as excellent with curved surfaces as with plane surfaces. The street sign embodiment utilizes wedge shaped light carrying members to provide greater uniformity of lighting when a single central source of lighting is used in displays of large area. By forming the sheet of light carrying material with a wedge shape or tapered surface decreasing in thickness from the light source the light is reflected and refracted such as to be as brilliant when reflected from the display member at the far end of the sheet as at a position near the light source. As noted, herein, lighting uniformity can be improved by segmenting the display material as by ruling or stippling to create more edges. This technique is especially useful for large area displays such as the arrow 71 shown as the display member. The segmenting can take any pattern. The only requirement is that more edges be created.

Referring to FIGURE 9, a clock face is shown as another possible embodiment with the numbers 80 and time marks 81 the pertinent display. If desired the clock hands 82 can be made part of the display. This can be achieved by making the hands 82 of a transparent light carrying material. The back surface of the hands 82 and the edges thereof are covered with an intimate contacting reflective material; the light source is placed at the hub 83 of the hands whereby the clock hands are brilliantly illuminated and sharply stand out from the main body of the clock face.

Referring to FIGURE 10, an illumination panel incorporating the invention is illustrated. The panel comprises a light carrying sheet 90 and illumination means 91 disposed along the sheet in cylindrical chambers 92 provided therefor. The cylindrical chambers are covered with opaque reflective material in intimate contact with the surface of the cylinders except at the areas where it is desired to longitudinally transmit the light. The broad upper expanse between cylinders 92 are in intimate contact with reflective display members 93, thus when the illumination means 91 are energized, light reflects downward in the pattern of the display. By varying the pattern of the display members, beautiful decorative effects may be achieved and the illumination panel can be equally well utilized for information purposes.

Referring to FIGURE 11, a luminaire is shown as another embodiment of the invention. Similarly to the embodiment shown in FIGURE 10 the light source 91 is coaxially arranged within a light carrying semicylinder 92 or other desired light carrying shape. The rear surface of the semicylinder is covered with an opaque diffusing material to reflect the light out. Unusual decorative effects can be achieved by varying the pattern of the opaque reflective covering on the rear surface of the semicylinder.

In many of the illustrated embodiments, the light carrying sheet is edge-lighted, that is the light is radiated from a position external to the sheet; it is to be noted that the lighting source may be positioned within the light carrying sheet for forming a cavity in the sheet to achieve the same results. The opaque diffusive covering which is in intimate contact with the pertinent surfaces of the desired embodiment contains the light so that it is transmitted longitudinally whether the light source is outside of or within the transparent light carrying member.

From the foregoing it can be seen that many variations of embodiments can be devised utilizing the concepts of the present invention. One of the primary areas of utility is where a readout is necessary, which readout or message is the same but intermittent or differs and is intermittent. Thus, an area of opaque diffusing material can be positioned in intimate contact as described hereinbefore on the surface 14 of the sheet 11 in FIGURE 1. The area can, for example, be rectangular in shape and if the area is extensive it is segmented as previously described. Upon the other surface 12 of the sheet 11 an opaque readout mask is then positioned with openings spelling out or forming the message to be seen. The openings, such as stenciled letters through the opaque sheet are positioned opposite the intimate contact reflecting surface. When the edge light is energized the message or readout becomes immediately, brilliantly visible. Similarly, it can be seen that various display members can be affixed to a plurality of sheets which are interchangeable into an apparatus carrying the light source such that one message or display can be readily substituted for another.

Also, a display by means of which a predetermined number of character can be energized can be readily constructed in accordance with the present invention to display the number or character desired by energizing one of a plurality of light sources. Thus, a display can be formed of shaped pieces constructed in accordance with the foregoing and fitted together with opaque reflective surfaces between each piece and a light source included within each piece. The number or character displayed then depends upon the light source or combination of light sources which are energized.

To summarize, the present invention provides an improved illuminated display or panel which includes a light carrying sheet with means for longitudinally transmitting and containing light between the display surfaces of the sheet. A display member having an opaque diffusing surface is in intimate contact with one of the display surfaces.

Thus, strips or segments or opaque light diffusing materials are positioned in direct intimate contact, as above defined, with a transparent light carrying material to obtain maximum and optimum reflected light intensity and distribution from the segments or strips. Light is caused to be transmitted and confined through the light carrying material from a suitable light source placed around the periphery of the light carrying material or confined at any convenient point within the area of the transparent light carrying material.

The display or luminaire may be used with or without opaque backups; with or without transparent color filter over the light source and/or the face of the display or luminaire. The opaque segment may be made in any predetermied shape and size to produce the desired displays or effects.

The invention includes the preparation and achievement of the displays, luminaires and reflectors, utilizing the above construction for maximum reflected light intensity and uniformity from a light source or sources which can be placed on the periphery of, or at any point within the body of the transparent light carrying material. The light source may be made integral with or attached to the transparent light carrying material. The invention also includes the practical application of these construction features in such dynamic and/or static light reflecting devices as described above.

Although this invention is described with a certain degree of particularity, it is understood that the present disclosure has been made only by way of example and that numerous changes in the details of construction may be resorted to without departing from the spirit and the scope of the invention as hereinafter claimed.

What is claimed is:
1. An illuminated display comprising:
   a light transmitting member having first and second opposed surfaces;
   a light source for directing light longitudinally through said light transmitting member between said opposed surfaces thereof;
   an opaque display member; and
   means for selectively moving said display member into intimate contact with said first opposed surfaces; whereby said display member reflects light and is visibly illuminated and contrasted with its surroundings when said display member is brought into contact with said one surface.

2. The apparatus as defined in claim 1 wherein said means for selectively moving said display member into contact with said one surface includes means movable transversely from a first position spaced from said one surface to a second position adjacent said one surface with said display member interposed between said movable means and said one surface and in intimate pressure contact with said one surface at said second position of said movable means and out of intimate contact at said first position.

3. The apparatus as defined in claim 2 wherein said movable means is a plunger having a surface of predeterminted configuration reciprocable from said first to said second position.

4. The apparatus as defined in claim 2 wherein said movable means is a cam surface pivotable from said first to said second position.

5. An illuminated display comprising a light transmitting member having opposed surfaces, a light source for directing light longitudinally through said light transmitting member between opposed surfaces thereof, an opaque display member and means for selectively bringing said display member into intimate contact with one of said opposed surfaces of said light transmitting member, said light transmitting member defining peripheral edges, said edges of said light carrying member being covered with opaque material in intimate contact with said edges of said light carrying member, whereby the transmitted light is contained within said light carrying member and said display member reflects light and is visibly illuminated and contrasted with its surroundings when said display member is brought into contact with said one surface.

6. An illuminated display comprising a light transmitting member, a light source for directing light longitudinally through said light carrying member, an opaque display member, cam moving means for selectively bringing portions of said display member in continuous sequence into intimate contact with said light transmitting member, said light transmitting member defining peripheral edges, said edges of said light carrying member being covered with opaque material, said material being in intimate contact with said edges of said light transmitting member, whereby said display member, as it sequentially comes into intimate contact with said light carrying member, reflects light and produces a sequential effect which is visibly illuminated and is contrasted with its surroundings.

References Cited

UNITED STATES PATENTS

| 800,560 | 9/1905 | Faber et al. | 40—28 |
| 1,146,361 | 7/1915 | Spencer et al. | 40—130 |
| 1,843,980 | 2/1932 | Hatchner | 40—130 |
| 2,347,665 | 5/1944 | Christensen et al. | 40—130 |
| 2,404,627 | 7/1946 | Goldberg | 40—130 |
| 2,448,244 | 8/1948 | Arnold | 40—130 |
| 2,634,530 | 4/1953 | Herschede et al. | 40—130 |
| 2,689,917 | 9/1954 | Switzer | 40—130 X |
| 2,917,838 | 12/1959 | Neugass | 40—130 X |
| 3,197,902 | 8/1965 | Buzan | 40—130 |

FOREIGN PATENTS 28,321   7/1931   Australia.

OTHER REFERENCES

"Modern Plastics," August 1946, article entitled "Piping Light With Acrylic Materials" by Henry Pearson, pp. 123–127, copy in class 40—130K.

LAWRENCE CHARLES, *Primary Examiner.*